United States Patent [19]

Signorini et al.

[11] Patent Number: 5,302,367
[45] Date of Patent: Apr. 12, 1994

[54] PROCESS FOR OBTAINING AQUEOUS HYDROGEN PEROXIDE SOLUTIONS

[75] Inventors: Lido Signorini; Konstantin Glinos, both of Brussels; Philippe Deroisy, Wavre; Fabienne Banneux, La Louviere, all of Belgium

[73] Assignee: Interox International (Societe Anonyme), Brussels, Belgium

[21] Appl. No.: 932,390

[22] Filed: Aug. 20, 1992

[30] Foreign Application Priority Data

Aug. 27, 1991 [BE] Belgium .............. 09100788

[51] Int. Cl.$^5$ .......................... C01B 15/023
[52] U.S. Cl. ................ 423/588; 423/589; 423/590
[58] Field of Search ............ 423/588, 589, 590

[56] References Cited

U.S. PATENT DOCUMENTS

| 2,901,323 | 8/1959 | Sprauer | 423/590 |
| 3,043,666 | 7/1962 | Siwinski | 423/588 |
| 3,073,755 | 1/1963 | Banfield et al. | |
| 3,321,279 | 5/1967 | Williams | 423/588 |
| 3,372,990 | 3/1968 | Charret | 423/588 |
| 3,617,219 | 11/1971 | Cook et al. | 423/588 |
| 3,714,342 | 1/1973 | Kabisch | 423/588 |
| 3,949,063 | 4/1976 | Coingt | 423/588 |

FOREIGN PATENT DOCUMENTS

| 0032338 | 7/1981 | European Pat. Off. |
| 1299335 | 9/1961 | France |
| 1412812 | 10/1964 | France |

OTHER PUBLICATIONS

The Industrial Chemist, "A New Process for Hydrogen Peroxide", Jan. 1959, pp. 9-16.

Primary Examiner—Wayne Langel
Attorney, Agent, or Firm—Oblon, Spivak, McClelland, Maier & Neustadt

[57] ABSTRACT

Process for obtaining aqueous hydrogen peroxide solutions by the alkylanthraquinone process, providing a concentrated aqueous hydrogen peroxide solution with a low content of impurities, according to which a continuous addition of acidifying compounds and/or of stabilising compounds is performed, consisting in recycling towards the oxidation unit at least a part of the purge leaving the distillation unit.

7 Claims, 2 Drawing Sheets

PROCESS FOR OBTAINING AQUEOUS HYDROGEN PEROXIDE SOLUTIONS

BACKGROUND OF THE INVENTION

1. Field of the Invention

The invention relates to a process for the preparation of hydrogen peroxide by the alkylanthraquinone technique More particularly, the invention is concerned with providing a process for obtaining concentrated aqueous hydrogen peroxide solutions with low contents of impurities.

The invention also relates to a plant for obtaining concentrated aqueous hydrogen peroxide solutions which are purified from impurities.

2. Discussion of the Background

In the organic synthesis of hydrogen peroxide by the alkylanthraquinone process it is well known (European Patent EP-B1-0,032,338 in the name of Oxysynthese) to inject inorganic stabilisers at the oxidation stage with the aim of preventing the decomposition of the hydrogen peroxide produced. The stabilisers thus added pass into the extraction stage with the organic working solution containing the $H_2O_2$. At this point an additional quantity of inorganic salts and/or acids acting as stabilisers via pH control and as corrosion inhibitors is generally added via the stream of water feeding the extraction column. These stabilisers and acidifiers are extracted in the aqueous phase with the $H_2O_2$. The organic phase leaving the extraction unit, which is then recycled to the hydrogenation unit to recommence the production cycle, therefore no longer contains any stabiliser for $H_2O_2$ and must therefore be subjected to an addition of fresh stabilisers before returning to the oxidation.

In the distillation unit, an additional quantity of stabilisers is also frequently added to the water employed to form the liquid reflux of the rectification column (U.S. Pat. No. 3,073,755 in the name of Laporte Chemicals).

Since the large majority of the stabilisers and corrosion inhibitors and acidifiers which enter the distillation unit are relatively nonvolatile when compared with $H_2O_2$, they are encountered again in the purge with the impurities which are continuously removed from the distillation unit.

SUMMARY OF THE INVENTION

It has been found that, surprisingly, this hitherto discarded purge from the plant had good residual stabilising qualities, suitable for being employed in the oxidation unit.

The invention consequently relates to a process for obtaining aqueous hydrogen peroxide solutions by the alkylanthraquinone process, providing a concentrated aqueous hydrogen peroxide solution with a reduced content of impurities, according to which a continuous addition of acidifying compounds and/or of stabilising compounds is performed, consisting in recycling to the oxidation unit at least a part of the purge leaving the distillation unit.

DETAILED DESCRIPTION OF THE PREFERRED EMBODIMENTS

Figure 1:
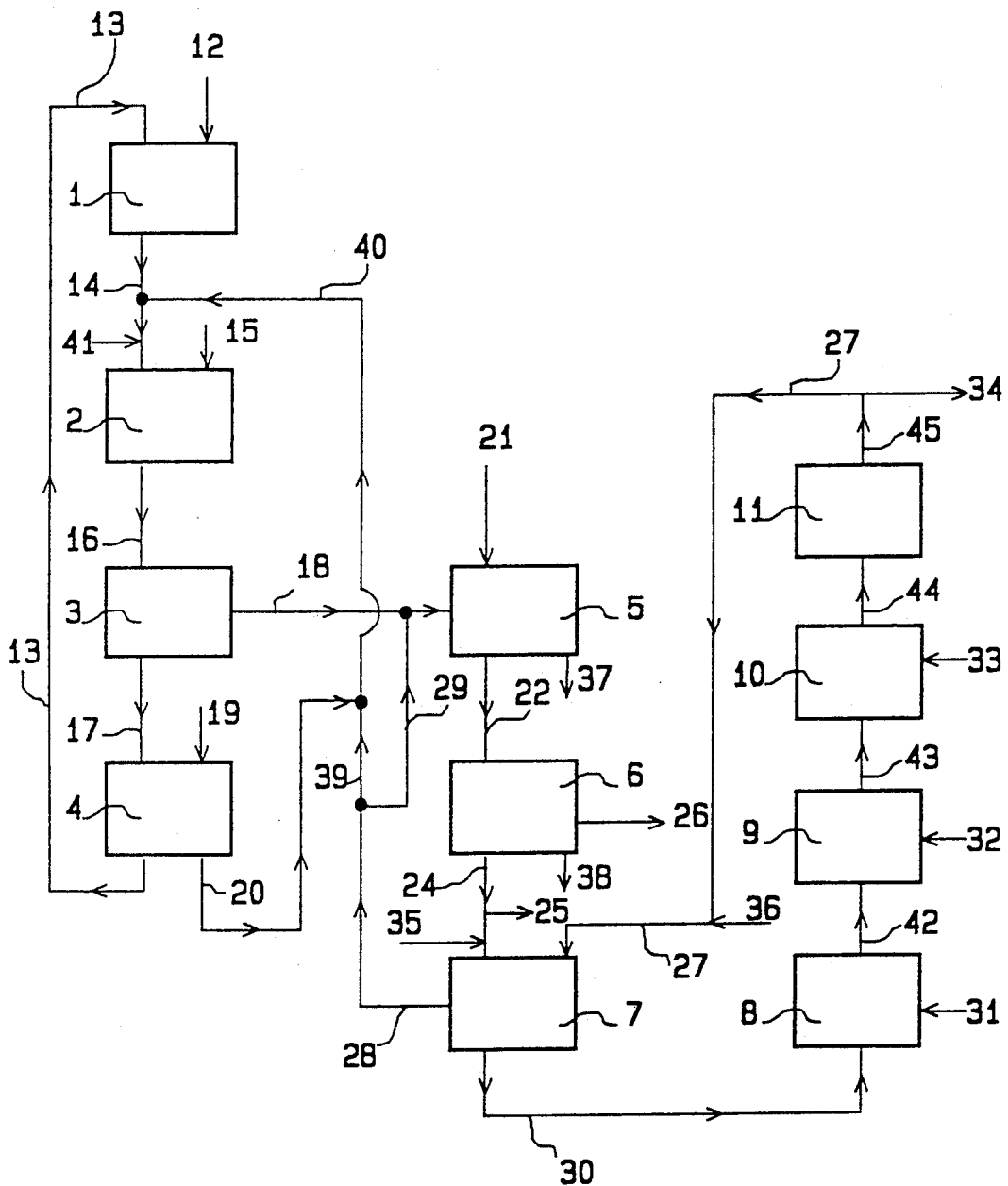
FIG. 1 is a schematic representation of a planet for the production of hydrogen peroxide by the alkylanthraquinone process.

The proportion of the purge recycled towards the oxidation unit depends on a large number of factors, which include the running conditions of the plant, the nature and the concentrations of impurities in the purge, and its flow rate. More than 3% of the volume of the purge and, preferably, more than 5% of this volume is generally recycled towards the oxidation unit. In most cases a recycle ratio of the purge of 95% by volume and, preferably 90% of this ratio, is not exceeded. A purge recycle ratio of 10% by volume has given good results.

An alkylanthraquinone process is intended to denote a process for the production of a concentrated aqueous hydrogen peroxide solution consisting in hydrogenating an organic working solution of at least one alkylanthraquinone and/or of at least one tetrahydroalkylanthraquinone to produce one or a number of alkylated anthrahydroquinones and/or tetrahydroanthrahydroquinones. The working solution containing the alkylated (tetrahydro)anthrahydroquinone solution is then subjected to oxidation with oxygen, air or oxygen-enriched air to yield hydrogen peroxide and to re-form the alkylated alkylanthraquinones and/or tetrahydroanthraquinones. The hydrogen peroxide formed is then separated from the organic working solution by means of an extraction stage using water, the hydrogen peroxide being recovered in the aqueous phase. The organic working solution containing the (tetrahydro)alkylanthraquinones is then recycled to the hydrogenation stage in order to recommence the hydrogen peroxide production cycle.

Alkylanthraquinones are intended to denote 9,10-anthraquinones substituted in position 1, 2 or 3 by at least one alkyl side chain of linear or branched aliphatic type containing at least one carbon atom. These alkyl chains usually contain fewer than 9 carbon atoms and preferably fewer than 6 carbon atoms. Examples of such alkylanthraquinones are 2-ethylanthraquinone, 2-isopropylanthraquinone, 2-sec- and 2-tert-butylanthraquinones, 1,3-, 2,3-, 1,4- and 2,7-dimethylanthraquinones, 2-iso- and 2-tert-amylanthraquinones and mixtures of these quinones.

Alkylanthrahydroquinones are intended to denote the 9,10-hydroquinones corresponding to the 9,10-alkylanthraquinones listed explicitly above.

The objective of the process according to the invention is to provide concentrated aqueous hydrogen peroxide solutions with a low content of impurities. It is well-suited for obtaining aqueous solutions with low contents of organic materials, that is to say containing less than 60 ppm of organic materials and, preferably, less than 30 ppm. The process is also highly suitable for reducing the content of inorganic impurities in aqueous hydrogen peroxide solutions. It can be employed, for example, for reducing the content of the inorganic materials to a value comparable with that of the organic materials or even, in some cases, to values lower than that of the organic materials.

Acidifying compounds are intended to denote inorganic acids intended to maintain the pH of the solution in an acidic range. The acids employed are generally chosen from sulphuric, nitric and phosphoric acids or a mixture of two or more of these acids.

The stabilising compounds according to the invention are generally inorganic salts of stannic acid and acids containing phosphorus, such as alkali metal stannates, pyrophosphates, metaphosphates and polyphosphates. Inorganic salts are intended to denote compounds in which all the hydrogen atoms of the corresponding acid have been replaced with one or more metal atoms, as well as the compounds in which only a proportion of the hydrogen atoms of the acid has been replaced by one or more metal atoms, and which are still acidic in character.

In accordance with the invention, at least a part of the purge leaving the distillation unit is recycled towards the oxidation unit. Before dilution, this purge has an $H_2O_2$ content of approximately 60 to 80% by weight, corresponding to approximately 10 to 20% by weight of the total quantity of hydrogen peroxide leaving the extraction unit, and contains most of the impurities. The quantity of organic impurities in the purge is generally greater than 500 and sometimes greater than 1000 ppm. The content of inorganic impurities in the purge is generally greater than 1000 ppm and often greater than 2000 ppm. It is usually smaller than 10,000 ppm and, in most cases, smaller than 8000 ppm.

For safety reasons an addition of demineralised water is made before the entry into the unit for scrubbing the purge, so as to reduce the hydrogen peroxide content of the latter by approximately 40%. This results in a reduction in the contents of impurities in the same proportion.

In an alternative form of the process according to the invention, which is preferred, a treatment to purify the purge is inserted before it is recycled to the oxidation stage. According to the invention, this purification treatment may consist of any treatment intended to decrease the content of organic impurities in the purge.

According to this alternative form of the invention, this purification treatment may consist of a washing of the purge with a polar solvent. This solvent must exhibit the property of being only slightly soluble in water and in aqueous hydrogen peroxide solutions. Such solvents generally belong to the class of alcohols, amides, ketones, alkyl phosphates and esters of carboxylic and phosphoric acids and mixtures thereof. Trioctyl phosphate and branched aliphatic alcohols are highly suitable. Among these alcohols, diisobutylcarbinol is particularly highly suitable.

An alternative form of this purification process consists in performing an additional washing of the purge with a water-immiscible nonpolar solvent so as to remove the small quantities of polar solvent dissolved during the preceding washing operation.

After washing of the purge the polar solvent may, preferably, undergo a purification treatment intended to regenerate it and to enable it to be recycled to the purge washing stage.

This regeneration treatment consists, for example, in subjecting the polar solvent to a sequence of a number of purification operations involving extractions with water and the destruction of certain organic impurities with a chemical reactant compatible with the polar solvent.

The sequence of the three stages: extraction with water, reaction with an aqueous solution of an alkaline reactant, followed by a new washing with water has given good results. The aim of the first stage of extraction with water is to extract the small quantity of hydrogen peroxide present in the dissolved state in the polar solvent. This hydrogen peroxide itself can also be recovered and recycled to the oxidation unit. The aim of the second stage of reaction with an aqueous solution of an alkaline reactant is to destroy a certain number of organic impurities such as organic peroxides, and that of the third stage of washing with water is to extract the soluble decomposition products generated in the second stage, as well as the surplus of alkaline reactant used in this stage. The alkaline reactant used can be an aqueous solution of an alkali metal or alkaline-earth metal hydroxide or an aqueous ammonia solution. A 1–2N aqueous sodium hydroxide solution at 80° C. has given good results.

The purification of the polar solvent can be improved by following its purification treatment described above with a treatment of adsorption of the residual impurities which it still contains. This adsorption treatment can be chosen from an adsorption treatment on a column packed with active charcoal, alumina or an ion exchange resin, for example a mixture of a cation exchange resin and an anion exchange resin, or a separate bed containing the anion exchange resin followed or preceded by a bed of cation exchange resin. The treatment of adsorption of the residual impurities can also be replaced with a separation of the latter by means of a distillation or steam-distillation operation. It is also possible to perform a number of stages chosen from the treatments described above.

According to a preferred alternative form of the process according to the invention, a part of the purge originating from the distillation unit is mixed with the crude aqueous hydrogen peroxide solution leaving the extraction unit and the mixture is recycled to the oxidation unit. The hydrogen peroxide produced is extracted from the system by means of a separator placed between the oxidation and extraction unit and intended to separate a crude aqueous phase containing the hydrogen peroxide produced from the organic working solution, in order to allow this crude aqueous phase to be directed towards the distillation stage, where a concentrated purified aqueous $H_2O_2$ solution and a purge containing the impurities, which is partially recycled towards the oxidation unit, are drawn off. The function of the separator is to separate the aqueous and organic phases originating from the oxidation unit. The extraction unit permits the transfer of the hydrogen peroxide generated in the oxidation unit within the organic phase forming the working solution, from this organic phase towards a crude aqueous solution which will subsequently be purified and concentrated to obtain the finished product.

The purified and concentrated aqueous hydrogen peroxide solutions which are produced by means of the process according to the invention generally have a $H_2O_2$ concentration higher than 50% by weight and, in most cases, higher than 60%. Similarly, these purified solutions generally contain less than 80% by weight of $H_2O_2$ and, in most cases, less than 75%.

The invention also relates to a plant for the production of hydrogen peroxide by the alkylanthraquinone process, comprising a unit for hydrogenation of an organic working solution containing the alkylanthraquinones in solution, a unit for oxidizing the hydroquinones produced in the hydrogenation unit, a unit for extraction of the hydrogen peroxide from the organic working solution and a unit for distilling the crude aqueous hydrogen peroxide solution originating from the extraction unit, according to which a scrubber fed with a polar solvent receives the purge leaving the distillation unit, a first part of the washed purge is mixed with the crude aqueous solution leaving the extraction unit and the mixture is recycled to the oxidation unit, while the other part of the purge is recycled to the distillation unit.

According to the invention, the polar solvent leaving the purge scrubber is purified in a purification unit comprising at least one first scrubber using water, a reactor fed with an aqueous solution of an alkaline reactant and at least one final scrubber using water.

The scrubbers for the liquid streams employed in the process according to the invention can be constructed according to any technology which is well known in the chemical industry, for example liquid-liquid extraction columns with perforated trays or with packing, operating countercurrentwise, or washing units comprising a perfectly mixed vessel followed by a phase separator.

Furthermore, the plant is detailed more clearly in the description which follows.

Referring to FIG. 1, the plant essentially comprises a hydrogenation unit with hydrogen gas 12 and with the organic working solution containing the alkylanthraquinones via the pipework 13. The hydrogenated working solution containing the alkylanthrahydroquinones leaves the hydrogenation unit 1 via the pipework 14 and enters the oxidation unit 2 fed with air 15. Before the oxidation stage 2 the organic working solution from the pipework 14, containing the alkylanthrahydroquinones, is mixed via the conduit 40 with the recycled crude aqueous solution originating from the extraction 4 and washing 7 units. After oxidation the mixture of organic working solution and of recycled crude aqueous solution leaves the oxidation unit 2 via the pipework 16 and enters a separator 3 where the separation of the organic phase leaving the separator 3 via the pipework 17 from the aqueous phase leaving the separator via the pipework 18 is carried out. The pipework 17 enters the extraction unit 4, which moreover is fed with pure water via the entry 19. The crude aqueous solution leaving the extraction unit 4 and containing hydrogen peroxide is recycled to the entry of the oxidation unit via the pipeworks 20, 40 and 14. The organic working solution depleted in hydrogen peroxide leaves the extraction unit 4 via the pipework 13 and is then recycled to the hydrogenation unit 1 in order to start a new production cycle therein.

The extraction unit 4 may consist of any apparatus which is well known per se for extracting a solution of a liquid by means of another liquid which is immiscible with the first one, such as, for example, centrifugal extractors or liquid-liquid extraction columns operating countercurrentwise. Liquid-liquid extraction columns are preferred.

The crude aqueous hydrogen peroxide solution leaving the separator 3 via the pipework 18 is introduced into a purifier 5 fed with an organic solvent at 21. This organic solvent consists of at least one nonpolar solvent or of a mixture of at least one nonpolar solvent and of at least one water-immiscible polar solvent. The pipework 37 enables the organic solvent to leave the purifier 5. The nonpolar solvents which may be employed are, for example, a hydrocarbon or a mixture of optionally halogenated aliphatic and/or aromatic hydrocarbons such as methylene chloride or the solvents of registered trade mark Solvesso and Shellsol. Polar solvents which may be chosen are, for example, an alcohol or a mixture of alcohols, an amide, an ester of a carboxylic or phosphoric acid, an alkyl phosphate or a mixture of at least two of these solvents. Diisobutylcarbinol is highly suitable.

The purified crude aqueous solution enters a distillation unit 6 via the pipework 22. The purpose of this distillation unit is to concentrate the crude aqueous hydrogen peroxide solution 22 and to separate off and concentrate in the purge 24 a high proportion of the impurities which it contains. This unit essentially comprises an evaporator which feeds vapour at the foot of a distillation column in which a liquid reflux produced at the head of the column travels countercurrentwise. The pipework 38 permits the vapour reduced at the head of the distillation column to escape from the distillation unit 6. This distillation unit 6 is also fed with pure water 23 intended to form the reflux liquid of the distillation column. The purified and concentrated aqueous hydrogen peroxide solution constituting the plant output is drawn off from the distillation unit 6 via the pipework 26. The purge leaving the distillation unit 6 via the pipework 24 is partly drawn off via the pipework 25 and partly directed towards the recovery and washing unit 7 fed with polar solvent 27, after having been diluted with pure water via the pipework 35.

The washed purge leaving the scrubber 7 via the pipework 28 is then divided into two streams, the first stream 29 is recycled into the pipework 18 which feeds the purifier 5 preceding the distillation unit 6 and the second stream 39 is mixed with the crude aqueous hydrogen peroxide solution leaving the extraction unit 4, to form the stream 40 which is recycled to the oxidation unit 2.

The impurity-laden polar solvent extracted from the washing unit 7 is conveyed via the pipework 30 towards a treatment and recovery unit comprising a first stage 8 for washing with pure water which enters via the pipework 31 and then, via the pipework 42, towards the treatment in a reactor 9 with an aqueous NaOH solution introduced via 32, for washing-extraction via the pipework 43 in the scrubber 10 with pure water introduced via the pipework 33 and finally for separation of the last impurities via the pipework 44 in a unit 11 for adsorption on a solid adsorbent. The treated polar solvent is then recycled via the pipeworks 45 and 27 to the stage 7 for washing the purge from the distillation unit 6. A polar solvent purge is also provided via the pipework 34. This purge can be removed or can undergo a purification treatment with a view to recovery of the solvent which it still contains. Similarly, an addition of fresh polar solvent can also be made via the pipework 36.

In addition to the recycling of the purge it is also possible to perform a supplementary addition of stabilising and/or acidifying compounds in the form of fresh materials. This alternative form, which is not preferred, is carried out by injecting these compounds directly into at least one of the pipeworks 41 (oxidation), 19 (extraction) and 23 (distillation).

Figure 2:
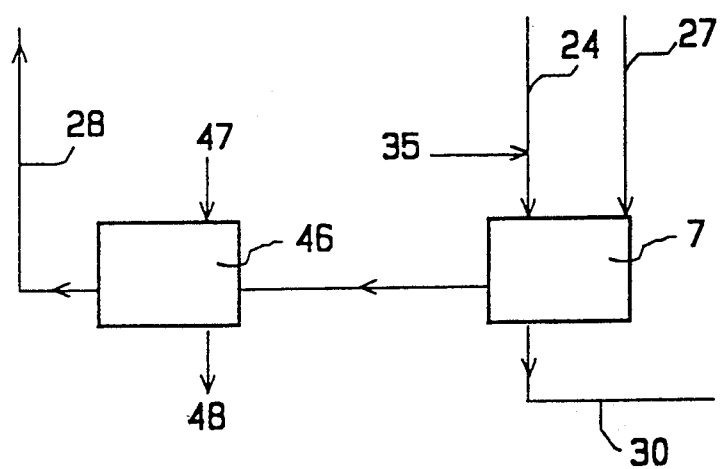
FIG. 2 represents an alternative form of the plant according to the invention.

Referring to FIG. 2, an alternative form of the plant according to the invention consists in following the unit for washing the purge 7 with an additional scrubber 46 fed with nonpolar solvent 47 to recover the small quantity of polar solvent dissolved in the aqueous phase during the preceding washing operation in the unit 7. The nonpolar solvent containing the small quantity of recovered polar solvent leaves the scrubber 46 via the pipework 48. The nonpolar solvent fed via the pipework 47 must not be water-miscible and can be chosen in the same way as that employed in the purifier 5 via the pipework 21. It is generally advantageous that both these nonpolar solvents should be chosen to be identical.

We claim:

1. A process for obtaining aqueous hydrogen peroxide comprising:
   (1) hydrogenating an organic solution which comprises (i) an alkylanthraquinone and (ii) an organic solvent;
   (2) combining said organic solution with an aqueous solution which comprises (i) water and (ii) the purge containing an inorganic stabilizer, an acidifying compound or a mixture thereof obtained in step (5a) and oxidizing the combined solution;
   (3a) separating said aqueous solution from said organic solution;
   (4) returning said organic solution to step (1);
   (5a) distilling said aqueous solutin to obtain a hydrogen peroxide solution and a purge,
   (6) repeating steps (1) to (6).

2. The process according to claim 1, which further comprises a step (5b) of purifying said purge.

3. The process according to claim 2, wherein said purification step comprises washing said purge with a polar solvent.

4. The process according to claim 3, wherein said polar solvent is diisobutylcarbinol.

5. The process according to claim 3, which further comprises the step of:
   (5c) subsequently treating said polar solvent with a treatment comprising the steps of:
      (i) washing said polar solvent with water,
      (ii) treating said polar solvent with an aqueous solution of an alkaline reactant,
      (iii) washing said polar solvent with water; and
   (5b) recycling the treated polar solvent to step (5b).

6. The process according to claim 5, wherein said treatment further comprises (iv) either contacting said polar solvent with an adsorbent or distilling said polar solvent.

7. The process according to claim 1, which further comprises the step (3b) of extracting said organic phase with a second aqueous solution and subsequently combining said second aqueous solution with said purge obtained in step (5a).

* * * * *